(12) United States Patent
Ihrke et al.

(10) Patent No.: US 8,919,842 B2
(45) Date of Patent: Dec. 30, 2014

(54) ROBOT ARM WITH TENDON CONNECTOR PLATE AND LINEAR ACTUATOR

(71) Applicants: GM Global Technology Operations LLC, Detroit, MI (US); The United States of America As Represented by the Administrator of the National Aeronautics and Space Administration, Washington, DC (US)

(72) Inventors: Chris A. Ihrke, Hartland, MI (US); Myron A. Diftler, Houston, TX (US); Lyndon Bridgwater, Houston, TX (US); Vienny Nguyen, Columbus, OH (US); Alexander Millerman, Bloomfield Hills, MI (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 0 days.

(21) Appl. No.: 14/175,095

(22) Filed: Feb. 7, 2014

(65) Prior Publication Data

US 2014/0217762 A1    Aug. 7, 2014

Related U.S. Application Data

(60) Provisional application No. 61/762,037, filed on Feb. 7, 2013.

(51) Int. Cl.
*B25J 15/00* (2006.01)
*B25J 15/12* (2006.01)

(52) U.S. Cl.
CPC ................ *B25J 15/12* (2013.01); *Y10S 901/29* (2013.01)
USPC ............................................ 294/111; 901/29

(58) Field of Classification Search
CPC .... B25J 15/0009; B25J 9/104; B25J 15/0233; B25J 15/08; B25J 17/02; B25J 17/0283; A61F 2/583; A61F 2/585; A61F 2/586; A61F 2002/583; A61F 2002/586; Y10S 901/29
USPC ......... 294/111, 213, 106; 623/64; 901/29, 38, 901/39
See application file for complete search history.

(56) References Cited

U.S. PATENT DOCUMENTS 6,817,641 B1 * 11/2004 Singleton, Jr. ................. 294/106
8,245,594 B2 *  8/2012 Rogers et al. ............... 74/490.06

(Continued)

*Primary Examiner* — Saul Rodriguez
*Assistant Examiner* — Gabriela Puig
(74) *Attorney, Agent, or Firm* — Quinn Law Group, PLLC

(57) ABSTRACT

A robotic system includes a tendon-driven end effector, a linear actuator, a flexible tendon, and a plate assembly. The linear actuator assembly has a servo motor and a drive mechanism, the latter of which translates linearly with respect to a drive axis of the servo motor in response to output torque from the servo motor. The tendon connects to the end effector and drive mechanism. The plate assembly is disposed between the linear actuator assembly and the tendon-driven end effector and includes first and second plates. The first plate has a first side that defines a boss with a center opening. The second plate defines an arcuate through-slot having tendon guide channels. The first plate defines a through passage for the tendon between the center opening and a second side of the first plate. A looped end of the flexible tendon is received within the tendon guide channels.

18 Claims, 3 Drawing Sheets

(56) References Cited

U.S. PATENT DOCUMENTS

| | | | |
|---|---|---|---|
| 8,523,509 B2 * | 9/2013 | Park et al. | 414/736 |
| 8,579,343 B2 * | 11/2013 | Park et al. | 294/111 |
| 2010/0259057 A1 * | 10/2010 | Madhani | 294/106 |
| 2011/0040408 A1 * | 2/2011 | De La Rosa Tames et al. | 700/258 |
| 2011/0071664 A1 * | 3/2011 | Linn et al. | 700/213 |
| 2011/0071678 A1 | 3/2011 | Ihrke et al. | |
| 2012/0109379 A1 * | 5/2012 | Abdallah et al. | 700/260 |
| 2012/0194120 A1 * | 8/2012 | Reiland et al. | 318/611 |
| 2013/0219586 A1 | 8/2013 | Ihrke et al. | |
| 2013/0226350 A1 * | 8/2013 | Bergelin et al. | 700/275 |
| 2013/0313844 A1 * | 11/2013 | De La Rosa Tames et al. | 294/106 |
| 2014/0222199 A1 * | 8/2014 | Ihrke et al. | 700/253 |

* cited by examiner

ROBOT ARM WITH TENDON CONNECTOR PLATE AND LINEAR ACTUATOR

CROSS-REFERENCE TO RELATED APPLICATION

This application claims the benefit of U.S. Provisional Patent Application No. 61/762,037, filed Feb. 7, 2013, and which is hereby incorporated by reference in its entirety.

STATEMENT REGARDING FEDERALLY SPONSORED RESEARCH OR DEVELOPMENT

This invention was made with government support under NASA Space Act Agreement number SAA-AT-07-003. The invention described herein may be manufactured and used by or for the U.S. Government for U.S. Government (i.e., non-commercial) purposes without the payment of royalties thereon or therefor.

TECHNICAL FIELD

The present disclosure relates to a robot arm that includes a tendon connector plate and one or more linear actuators.

BACKGROUND

Robotic grippers are multi-fingered automated devices capable of grasping and manipulating objects. A typical robotic gripper includes a robot arm having two or more moveable end effectors, e.g., jointed fingers/thumbs or rigid, non jointed pinchers. The end effectors move via actuation of one or more robotic joints. The fingers of some types of robotic grippers are remotely connected to a corresponding actuator via a length of flexible tendon, which is kept taut to within a calibrated tension level. The tendon is then transitioned to a higher tension level in order to actuate a given finger or thumb. The use of tendon-driven end effectors in a given robotic gripper, whether in the form of a single robot arm or a high degree of freedom autonomous robot, can reduce the overall size and weight of the gripper relative to conventional designs.

SUMMARY

The invention described herein may be used with a tendon-driven robotic end effector moveable via drive mechanism, e.g., a motorized ball screw. Such a design may be improved via a tendon connector plate assembly. The plate assembly includes various design features that are intended to help route lengths of flexible tendon, e.g., braided polymers, between the drive mechanism and a particular one of the end effectors. Additionally, the disclosed designs reduce wear and friction on the flexible tendons while also facilitating repair and replacement of the tendons when this eventually becomes necessary.

In a particular configuration, a robotic system includes a tendon-driven end effector such as a robotic finger, a linear actuator assembly, a flexible tendon, and a plate assembly. The linear actuator assembly includes a servo motor and a drive mechanism. The drive mechanism is translatable in a linear direction with respect to a drive axis of the servo motor in response to an output torque from the servo motor. The flexible tendon, which is connected to the tendon-driven end effector and to the drive mechanism, may include a looped end that is connected to the drive mechanism, for instance to an arcuate-shaped surface slot of a tendon hook.

The plate assembly in this example embodiment is disposed between the linear actuator assembly and the tendon-driven end effector, and includes first and second plates. The first plate has a first side defining a boss with a center opening through which the flexible tendon passes. The second plate defines at least one arcuate through-slot having a pair of tendon guide channels. The first plate defines a funnel or other through passage that opens on the second side directly opposite the boss, and that terminates at the center opening. The flexible tendon is received within the pair of tendon guide channels of the first plate, e.g., at the looped end.

The first plate may define a T-shaped post having tapered or chamfered sides. The tendon guide channels in such a design are at least partially defined by the T-shaped post.

A robotic arm is also disclosed. In an example design, the robotic arm includes a forearm, wrist, hand, plate assembly, linear actuator assembly, and flexible tendon. The wrist is connected to the forearm. The hand, which is connected to the wrist, has an end effector in the form of a tendon-driven finger. The plate assembly is positioned within the forearm. The linear actuator assembly, which is also positioned within the forearm, has a servo motor and a drive mechanism with a translatable tendon hook. The drive mechanism translates in a linear direction with respect to a drive axis of the servo motor in response to an output torque from the servo motor. The flexible tendon in this embodiment is constructed of a braided polymer and is connected to the tendon-driven finger and drive mechanism via a looped end of the tendon.

The plate assembly is disposed between the linear actuator assembly and the tendon-driven end effector, and includes first and second annular plates. The first annular plate has a first side that defines a rectangular boss with a center opening through which the tendon passes. The second annular plate defines at least one arcuate through-slot having a pair of tendon guide channels, and a T-shaped post within each arcuate through-slot slot. The T-shaped post includes chamfered sides. The tendon guide channels are at least partially defined by the T-shaped post. As with the embodiment noted above, the first plate may define a through passage that opens on the second side of the first plate directly opposite the boss, and that terminates at the center opening of the boss, i.e., a through passage for the tendon is defined through the first plate between the boss and the second side. The looped end of the tendon is received within the pair of tendon guide channels of the first plate.

The above features and advantages and other features and advantages of the present invention are readily apparent from the following detailed description of the best modes for carrying out the invention when taken in connection with the accompanying drawings.

DETAILED DESCRIPTION

Figure 1:
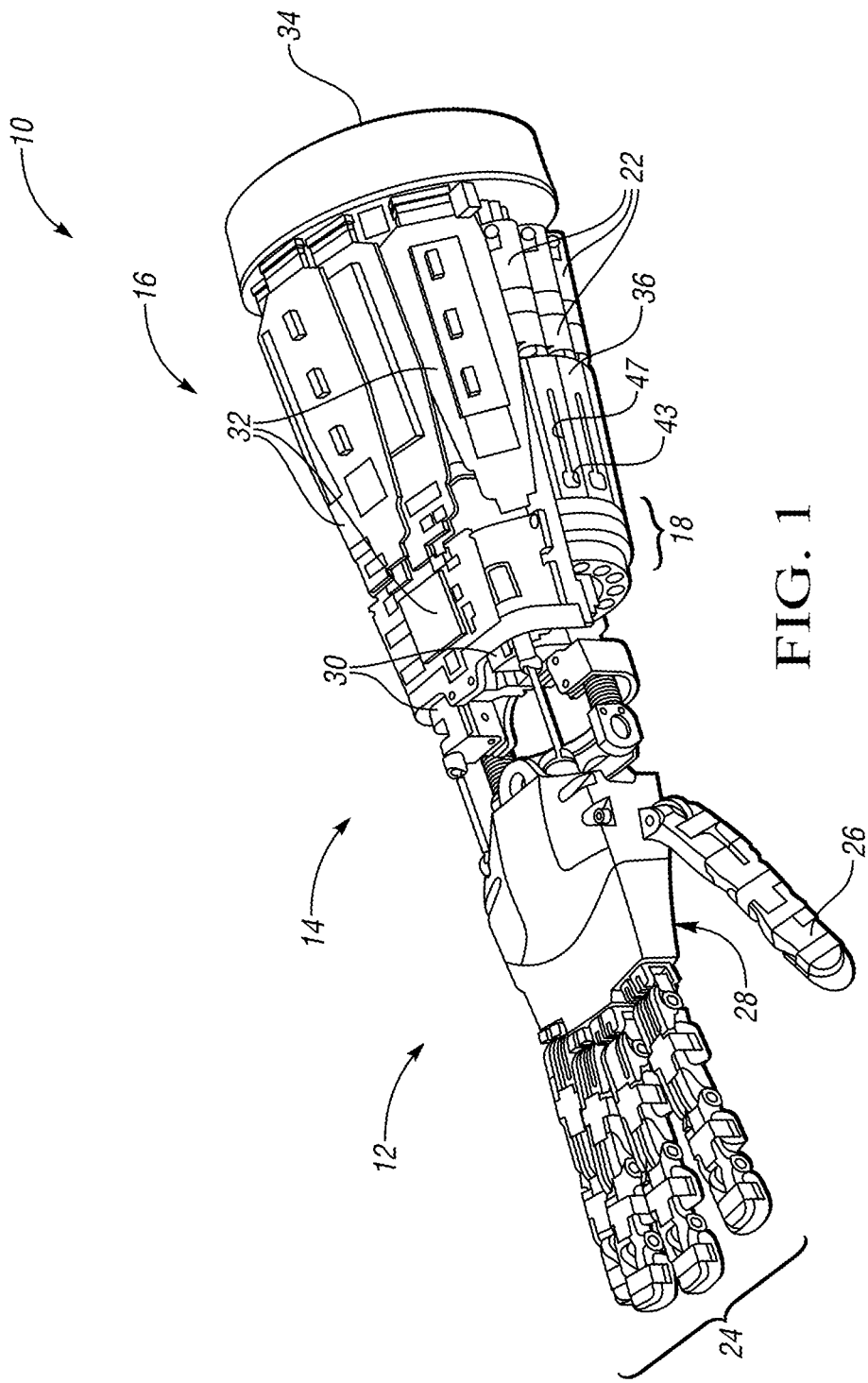
FIG. 1 is a schematic perspective view illustration of an example robot arm having tendon-driven fingers actuated via a set of linear actuators, and including a tendon connector plate assembly that enables simplified connection of an eye-spliced tendon to a corresponding linear actuator.

Referring to the drawings, wherein like reference numbers refer to the same or similar components throughout the several views, a robotic gripper in the form of an example robot arm 10 is shown in FIG. 1. The robot arm 10 may include a hand 12, a wrist 14, and a forearm 16. As described in further detail below with reference to FIGS. 2-5, the robot arm 10 also includes a tendon connector plate assembly 18 that, in the embodiment of FIG. 1, is disposed within the forearm 16. The tendon connector plate assembly 18 enables simplified connection of a flexible tendon 20 (see FIG. 2) to a respective linear actuator 22, an example of the latter being shown in FIG. 2. Various illustrations of the tendon connector plate assembly 18 are described below with reference to FIGS. 3-5.

The hand 12 is shown in FIG. 1 with four articulated, i.e., jointed, fingers 24 and an opposable thumb 26, with the fingers 24 and thumb 26 moveably mounted to a palm 28. The fingers 24 and the thumb 26 are able to curl toward the palm 28 when the tendons 20 (see FIG. 2) are tensioned via the linear actuators 22, a movement which allows grasping of an object (not shown). Other embodiments may be readily envisioned that use fewer fingers 24 and/or no thumb 26. For example, the hand 12 may have two fingers 24, whether configured as human-like jointed fingers in the embodiment of FIG. 1 or as conventional pinchers, provided that at least one of the fingers 24 remains tendon-driven.

The wrist 14 may include its own set of wrist actuators 30, which may be positioned adjacent to the wrist 14 and the forearm 16 and configured to set the attitude of the wrist 14 as needed, i.e., the pitch, yaw, and roll of the wrist 14. The control boards 32 may be embodied as printed circuit boards or control chips having one or more microprocessors and sufficient amounts of non-transitory and transitory memory, as well as any required analog-to-digital (A/D) and digital-to-analog (D/A) circuitry, input/output (I/O) circuitry, signal conditioning and buffering electronics, and the like. The control boards 32 may be mounted to or within the structure of the forearm 16 in communication with the linear actuators 22 and the wrist actuators 30, with the requisite motion control commands needed for moving the actuators 22 and 30 generated by the control boards 32 to the actuators 22 and 30. A load cell 34 may be used to connect the forearm 16 to an upper arm assembly (not shown), e.g., of a humanoid robot, or alternatively to a static or moveable base.

Multiple linear actuator assemblies 22 may be used to move the various fingers 24 and the thumb 26, with a given linear actuator assembly 22 applying tension to a tendon 20 of a corresponding finger 24 or thumb 26. The linear actuators 22 may be arranged in a compact manner within the forearm 16 or in another suitable structure if a forearm 16 is not used, for instance in a ring or an arc as shown.

The tendons 20 are constructed of a suitable flexible material such as a braided polymer. Because the tendons 20 move back and forth under tension, the tendons 20 are subject to wear over time. Likewise, the tendons 20 are constantly held under tension and thus subject to breakage. The structure of the tendon connector plate assembly 18 described hereinafter with reference to FIGS. 2-5 is therefore intended to eliminate extensive disassembly during maintenance of the robot arm 10 of FIG. 1, particularly when changing or repairing a tendon 20, and to enable a wide range of possible arrangements of the linear actuators 22 for multiple different robotic gripper devices.

In certain prior art approaches, each tendon 20 must be individually routed through a corresponding end cap piece, which in turn must be assembled via screws, so as to maintain a desired orientation of the tendon with respect to the rest of the linear actuator assembly 22. The present approach improves on such designs in part by dispensing with conventional end cap pieces in favor of the tendon connector plate assembly 18 described below with reference to FIGS. 2-5, thereby reducing the mean time to repair or replace a given tendon 20.

Figure 2:
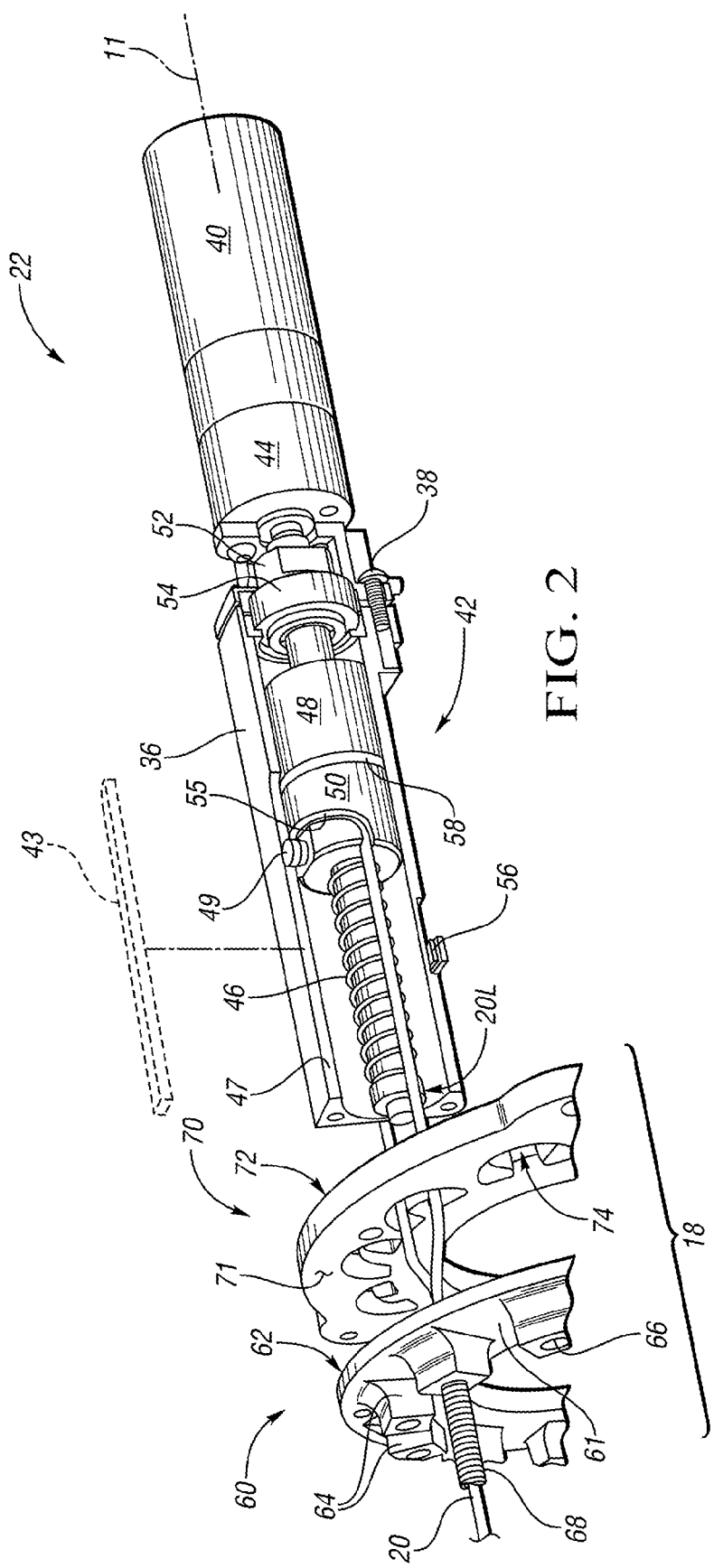
FIG. 2 is a schematic perspective view of an example linear actuator, tendon, and tendon connector plate.

Referring to FIG. 2, a perspective, partial cross-sectional illustration is provided for an example linear actuator 22. The linear actuator assembly 22 is positioned within a suitable outer protective housing 36, for example an aluminum or a molded plastic outer enclosure, which may be fastened together via screws 38 or other suitable means. Other linear actuator technologies may be employed in lieu of that shown in FIG. 2, such as roller screws or back-driveable lead screws, without departing from the intended inventive scope. A portion of the outer protective housing 36 is removed in FIG. 2 to show internal detail of the linear actuator assembly 22. Additionally, only the upper portion of the tendon connector plate assembly 18 is shown in FIG. 2, with the remaining structural details of the tendon connector plate assembly 18 described below with reference to FIGS. 3-5.

The linear actuator assembly 22 may include a servo motor 40 having a drive axis 11 and a drive assembly 42, for example a ball and screw-type device having a gear drive 44, that translates along the drive axis 11. The drive assembly 42 may also include an externally-threaded ball screw 46, an internally-threaded ball nut 48, and a tendon hook 50. The servo motor 40 may be energized via a battery (not shown) possibly colocated with the servo motor to deliver motor output torque to the gear drive 44. In turn, torque provided by the motor-driven gear drive 44 rotates the ball screw 46, thereby linearly translating the ball nut 48 and the tendon hook 50 with respect to the primary axis/length of the ball screw 46. A guide pin 49 may extend from the tendon hook 50 into an axial slot 47 of the outer protective housing 36 to help prevent any undesired rotation of the ball nut 48 and tendon hook 50 within the housing 36. The axial slot 47 may be covered by a removable stopper plug 43. Such a stopper plug 43 may be press-fitted or otherwise secured in place in the axial slot 47 during normal operation.

The gear drive 44 of FIG. 2 may be connected to the ball screw 46 via a coupling 52, which in turn may allow the coupling 52 to transmit torque from the gear drive 44. Additionally, a bearing 54 may be located between the coupling 52 and the ball screw 46 to reduce the level of friction between the outer protective housing 36 and the ball screw 46. The bearing 54 may also help carry the axial load transmitted from the tendon 20 to the ball screw 46. As part of the drive assembly 42, a magnet 58 may be positioned adjacent to the ball nut 48, and an optional position sensor 56 such as a Hall effect sensor may be mounted to the outer protective housing 36. The position sensor 56, by detecting the changing magnetic field of the magnet 58, may be used to determine the axial position of the ball nut 48 as the ball nut 48 moves along the ball screw 46. Alternatively, the position sensor 56 may include a linear encoder and/or employ other continuous or discrete forms of position sensing.

With respect to the tendon hook 50 shown in FIG. 2, the tendon 20 may be eye-spliced to form a looped end 20L. The looped end 20L in turn may be inserted into an arcuate surface slot 55 defined by the tendon hook 50, i.e., a curved or arc-shaped slot as shown, or otherwise engaged with the structure of the tendon hook 50. Torque from the servo motor 40 thus ultimately increases or decreases tension applied to the tendon 20 by linearly translating the tendon hook 50 and ball nut 48 with respect to the ball screw 46. In this manner, the fingers 24 and thumb 26 shown in FIG. 1 may be selectively opened and closed to perform a commanded grasp.

The axial slot 47 may be widened as shown adjacent to the tendon connector plate assembly 18 so as to provide an improved level of access to the tendon hook 50, e.g., when repairing or replacing one of the tendons 20. It may be desirable to prevent the tendon hook 50 from entering the widened region of the axial slot 47 except during repair or replacement of a tendon 20, which may be achieved by closing the axial slot 47, or just the widened connection region thereof, with the optional removable plug 43 of FIG. 1 during normal operation.

Still referring to FIG. 2, the tendon connector plate assembly 18 may include respective first and second plates 60 and 70. Because of the different required structure of the first and second plates 60 and 70, the use of separately-constructed first and second plates 60 and 70 may facilitate fabrication. However, a single plate may also be used, for instance via 3D printing or other processes capable of forming the requisite internal and external structural features of the first and second plates 60 and 70.

The first plate 60, which like the second plate 70 may be constructed from an annular disc of a suitable lightweight but high-strength material such as aluminum or molded plastic, includes respective first and second sides 61 and 62. The second side 62 is positioned immediately adjacent to, i.e., abutting, the second plate 70. However, for illustrative clarity the first and second plates 60 and 70 are shown in FIG. 2 as being separated by a small distance.

The first plate 60 defines a plurality of bosses 64, i.e., extensions or protuberances which project axially from the first side 61 of the first plate 60 in a direction opposite that of the linear actuator assembly 22. The bosses 64 are shown as being rectangular, i.e., roughly or precisely square or block-like, although the design is not limited to this shape. Each boss 64 regardless of its shape defines a circular center opening 66. The number of bosses 64 should equal the number of tendons 20 used in a given design, with one tendon 20 received within the center opening 66 of a given boss 64. A suitable conduit 68 such as a coil spring may be positioned adjacent to and coaxially with the center opening 66 of each boss 64 to provide a suitably resilient hard stop for any adjacent structure of the robot arm 10 shown in FIG. 1.

The second plate 70 shown partially in FIG. 2 includes respective first and second sides 71 and 72. The first side 71 is positioned adjacent to the first plate 60 as shown, with the second side 72 positioned facing the linear actuator assembly 22. The second plate 70 defines a plurality of arcuate through-slots 74, i.e., semi-circular or bow-shaped, and forms an opening fully through the radial thickness of the second plate 70. The looped end 20L of a given one of the tendons 20 is received within a corresponding one of the arcuate through-slots 74, with the two sides of the looped end 20L being spaced by the geometry of the through-slot 74. This geometry is described in further detail below with reference to FIG. 5.

Figure 3:
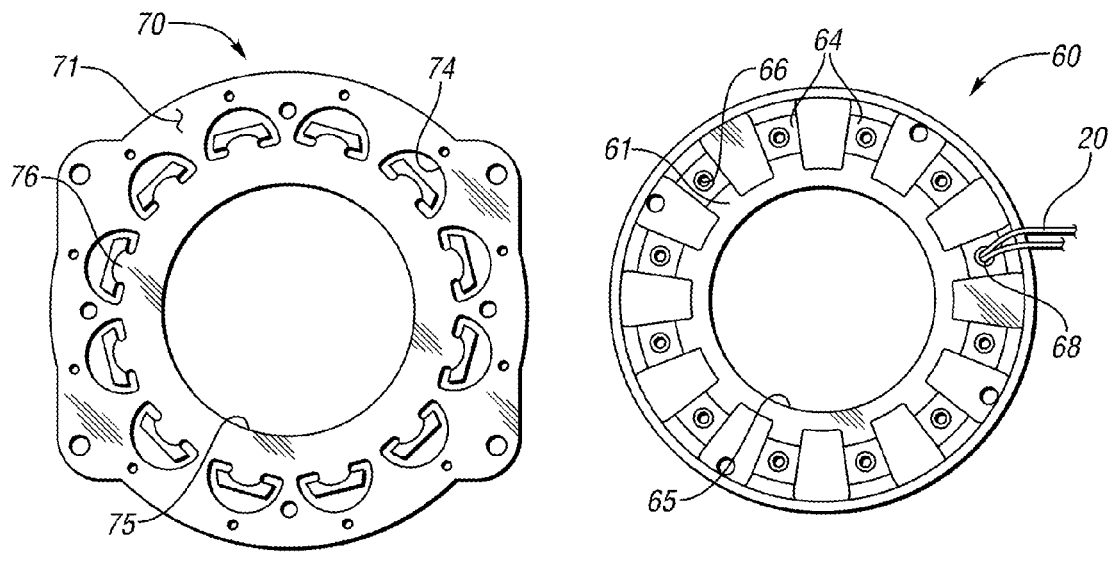
FIG. 3 is schematic plan view illustration of a first and second plate of the tendon connector plate assembly shown in FIG. 2.

Referring to FIG. 3, the first sides 61 and 71 of the respective first and second plates 60 and 70 are shown in plan view. FIG. 3 shows the view of the first and second plates 60 and 70 from the perspective of the hand 12 of FIG. 1, i.e., looking from the hand 12 back toward the linear actuator assemblies 22. When the respective first and second plates 60 and 70 are installed in the robot arm 10 of FIG. 1, the second side 72 of the second plate 70, as indicated in FIG. 2, is positioned adjacent to the actuator assemblies 22, with the first side 71 positioned immediately adjacent to/abutting the second side 62 of the first plate 60. Thus, with respect to the linear actuator assemblies 22 used in a given robot arm 10, the first side 61 of the first plate 60 is always positioned farthest away from the linear actuator assemblies 22, with the bosses 64 of the first plate 60 facing away from linear actuator assemblies 22.

The first and second plates 60 and 70 each define a corresponding center bore 65 and 75, respectively. Each center bore 65 and 75 is sufficiently sized to allow any mechanical or electrical components of the robot arm 10 of FIG. 1 to pass through, and thus further optimize packaging. The first plate 60 is shown to the right in FIG. 3 with equally-spaced bosses 64 arranged in a ring around the first side 61. A respective tendon 20 passes through the center opening 66 of each boss 64, as well as through the conduit 68 adjacent to the boss 64. The conduits 68, only one of which is shown in FIG. 2 for illustrative simplicity, may be press-fitted into the center opening 66. In a fully-assembled embodiment, each conduit 68 and center opening 66 would contain a corresponding tendon 20, and each tendon 20 would extend to a respective finger 24, thumb 26, and/or other tendon-actuated end effector of the robot arm 10 shown in FIG. 1.

To the left in FIG. 3, the second plate 70 likewise defines a plurality of the arcuate through-slots 74. The through-slots 74 correspond in both position and number with the bosses 64 of the first plate 60. A T-shaped post 76 extends radially within each through-slot 74, with the T-shaped post 76 ensuring the proper orientation and spacing of the tendon 20 for that particular through-slot 74.

Figure 5:
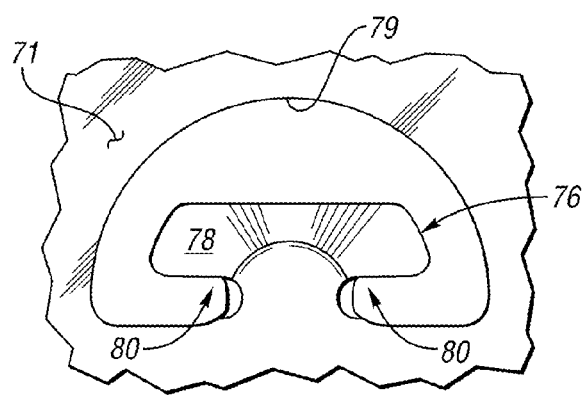
FIG. 5 is an enlarged portion of the schematic plan view illustration of FIG. 3.

Referring briefly to FIG. 5, the T-shaped post 76 includes chamfered sides 78, i.e., sufficiently beveled or otherwise smoothly contoured side surface which angle gently away from the first surface 71 and toward an inner wall 79 of the arcuate shaped through-slot 74. The two halves of the looped end 20L shown in FIG. 2 are received within a corresponding tendon guide channel 80, e.g., a filleted inner corner, adjacent to and defined at least in part by the T-shaped post 76. Spacing in this manner helps to ensure proper spacing and orientation of the tendons 20 within the outer protective housing 36 of FIG. 2. Beveling of the T-shaped post 76 to form the chamfered sides 78 also helps to minimize the amount of frictional wear on the tendon 20 as the tendon 20 slides within the tendon guide channels 80.

Figure 4:
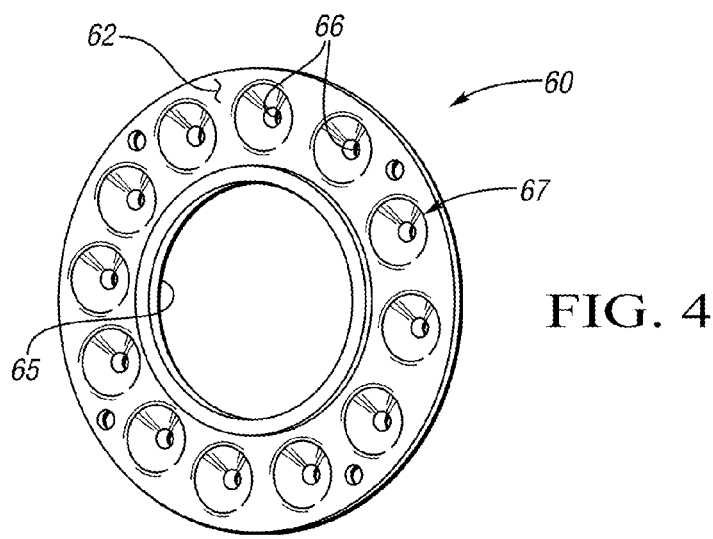
FIG. 4 is a schematic perspective view illustration of a portion of the tendon connector plate assembly shown in FIG. 3.

The second side 62 of the first plate 60 is shown in FIG. 4. The first plate 60 defines a plurality of through passages 67 opening directly opposite a corresponding boss 64, and terminating at the center opening 66. As with the chamfered sides 78 described above, the through passages 67 likewise provide a gently sloping, contoured surface that helps to minimize frictional wear on the tendon 20. An example shape for the through passages 67 to achieve this result is a funnel, with wider opening of the funnel located at the second surface 62 as shown in FIG. 4 and the narrow opening located on the first side 61. That is, a tendon 20 under increasing and decreasing levels of tension from the linear actuator 22 of FIG. 2 will slide back and forth within the center opening 66, effectively dragging across the surface of the through passages 67. Absent a sufficiently tapered or conical profile, the tendon 20 would be prone to premature wear due to the sliding motion of the tendon 20.

While the best modes for carrying out the invention have been described in detail, those familiar with the art to which this invention relates will recognize various alternative designs and embodiments for practicing the invention within the scope of the appended claims.

The invention claimed is:

1. A robotic system comprising:
   a tendon-driven end effector;
   a linear actuator assembly having a servo motor and a drive mechanism, wherein the drive mechanism translates in a linear direction with respect to a drive axis of the servo motor in response to an output torque from the servo motor;
   a flexible tendon that is connected to the tendon-driven end effector and to the drive mechanism, wherein the flexible tendon includes a looped end; and
   a plate assembly disposed between the linear actuator assembly and the tendon-driven end effector, wherein the plate assembly includes:
      a first plate having first and second sides, wherein the first side defines a boss having a center opening, and wherein the first plate defines a through passage between the center opening and the second side; and
      a second plate defining at least one arcuate through-slot having a pair of tendon guide channels;
   wherein the through passage receives the flexible tendon, and wherein the looped end of the flexible tendon is received within the pair of tendon guide channels of the second plate.

2. The robotic system of claim 1, wherein the tendon-driven end effector is an articulated finger of a robotic hand.

3. The robotic system of claim 1, wherein the drive mechanism includes a ball screw, a ball nut, and a tendon hook, and wherein the ball nut and the tendon hook are linearly translatable with respect to the ball screw along the drive axis via the output torque from the servo motor.

4. The robotic system of claim 3, wherein the flexible tendon is connected to the tendon hook.

5. The robotic system of claim 1, wherein the boss is rectangular, and wherein the through passage is a funnel that widens between the center opening and the second side of the first plate.

6. The robotic system of claim 1, wherein the second plate defines a T-shaped post having chamfered sides, and wherein the pair of tendon guide channels is at least partially defined by the T-shaped post.

7. The robotic system of claim 1, wherein the tendon-driven end effector includes a plurality of tendon-driven end effectors, the linear actuator assembly includes an equivalent plurality of linear actuator assemblies, and the flexible tendon includes an equivalent plurality of flexible tendon, and wherein the first plate and the second plate respectively define an equivalent plurality of the bosses and the arcuate through-slots.

8. The robotic system of claim 1, wherein the linear actuator assembly includes an outer protective housing defining an axial slot, the robotic system further comprising a removable stopper plug that is press-fitted into the axial slot.

9. The robotic system of claim 1, wherein the drive mechanism includes a tendon hook defining an arcuate surface slot, and wherein the looped end of the flexible tendon is received within the arcuate surface slot.

10. A plate assembly for a robotic system having a plurality of tendon-driven end effectors and a plurality of flexible tendons each connected to a respective one of the tendon-driven end effectors, the plate assembly comprising:
    a first plate having first and second sides, wherein the first side defines a plurality of bosses each with a center opening, and wherein the first plate defines a through passage between the center opening and the second side; and
    a second plate defining a plurality of arcuate through-slots each having a pair of tendon guide channels, wherein the through passage receives the flexible tendon, and wherein the tendon guide channels are configured to receive a looped end of a respective one of the plurality of flexible tendons.

11. The plate assembly of claim 10, wherein each of the plurality of bosses is rectangular.

12. The plate assembly of claim 10, wherein the second plate defines a plurality of T-shaped posts each having chamfered sides.

13. The plate assembly of claim 12, wherein each of the tendon guide channels is at least partially defined by a respective one of the T-shaped posts.

14. The plate assembly of claim 10, wherein the first and the second plate are annular discs each defining a respective center bore, and are constructed of a material selected from the group consisting of: aluminum and plastic.

15. A robotic arm comprising:
    a forearm;
    a wrist connected to the forearm;
    a hand connected to the wrist, and having a tendon-driven finger;
    a plate assembly disposed within the forearm;
    a linear actuator assembly positioned within the forearm, and having a servo motor and a drive mechanism with a translatable tendon hook, wherein the drive mechanism translates in a linear direction with respect to a drive axis of the servo motor in response to an output torque from the servo motor; and
    a flexible tendon constructed of a braided polymer that is connected to the tendon-driven finger and to the drive mechanism, wherein the flexible tendon includes a looped end that is connected to the tendon hook;
    wherein the plate assembly is disposed between the linear actuator assembly and the tendon-driven end effector, and includes:
       a first annular plate having first and second sides, wherein the first side defines a rectangular boss with a center opening, and wherein the first annular plate defines a funnel-shaped through passage between the center opening and the second side through which passes the flexible tendon; and
       a second annular plate defining at least one arcuate through-slot having a pair of tendon guide channels that receive the looped end of the flexible tendon, and a T-shaped post within the arcuate slot, wherein the T-shaped post includes chamfered sides and the tendon guide channels are at least partially defined by the T-shaped post.

16. The robotic arm of claim 15, wherein the drive mechanism includes a ball screw and a ball nut, and wherein the ball nut and the tendon hook are linearly translatable with respect to the ball screw along the drive axis via the output torque from the servo motor.

17. The robotic arm of claim 15, wherein the linear actuator assembly includes an outer protective housing defining an axial slot, the robotic system further comprising a removable stopper plug that is press-fitted into the axial slot.

18. The robotic arm of claim 15, wherein the flexible tendon is constructed of a braided polymer.

* * * * *